US012220823B2

(12) United States Patent
Zhang et al.

(10) Patent No.: US 12,220,823 B2
(45) Date of Patent: Feb. 11, 2025

(54) ELECTRONIC DEVICE REMOTE CONTROLLER

(71) Applicant: Future Dial, Inc., Sunnyvale, CA (US)

(72) Inventors: Yueting Zhang, San Jose, CA (US);
Haofeng Song, Santa Clara, CA (US);
Jisheng Li, Los Altos, CA (US)

(73) Assignee: Future Dial, Inc., Sunnyvale, CA (US)

( * ) Notice: Subject to any disclaimer, the term of this patent is extended or adjusted under 35 U.S.C. 154(b) by 574 days.

(21) Appl. No.: 17/525,635

(22) Filed: Nov. 12, 2021

(65) Prior Publication Data
US 2023/0166404 A1    Jun. 1, 2023

(51) Int. Cl.
*B25J 9/16*    (2006.01)
*B25J 9/12*    (2006.01)

(52) U.S. Cl.
CPC .............. *B25J 9/1689* (2013.01); *B25J 9/123* (2013.01)

(58) Field of Classification Search
CPC .......... B25J 9/123; B25J 9/1679; B25J 9/1689
See application file for complete search history.

(56) References Cited

U.S. PATENT DOCUMENTS

| 6,125,449 A * | 9/2000 | Taylor .................. G06F 1/26 345/212 |
| 7,774,633 B1 * | 8/2010 | Harrenstien ......... G06F 11/0793 713/323 |
| 2003/0058613 A1 * | 3/2003 | Varghese ............. H05K 7/1457 361/679.01 |
| 2022/0099182 A1 * | 3/2022 | Hasenkamp ........ F16H 63/3475 |

* cited by examiner

*Primary Examiner* — Dale Moyer
(74) *Attorney, Agent, or Firm* — Greenberg Traurig

(57) ABSTRACT

A device includes a housing. An actuator is disposed within the housing. The actuator includes an actuator arm extending from the housing. A motor controller is disposed within the housing to control the actuator. A network input/output device is configured to communicate with a computer device over a communications network. The actuator is controlled remotely by one or more commands received from the computer device.

20 Claims, 11 Drawing Sheets

ELECTRONIC DEVICE REMOTE CONTROLLER

FIELD OF THE TECHNOLOGY

At least some embodiments disclosed herein relate generally to electronic devices. More specifically, embodiments disclosed herein relate to a remote controller for electronic devices.

BACKGROUND

Electronic devices such as, but not limited to, network devices including network switches, routers, access points, network cards, and the like include configuration details specific to the particular device. These configuration details can be configured by a user. In some situations, the user may, for example, return a network device to the manufacturer or third party that may be interested in removing the configuration details specific to the particular device as configured by the user.

SUMMARY

In some embodiments, a device includes a housing. In some embodiments, an actuator is disposed within the housing. In some embodiments, the actuator includes an actuator arm extending from the housing. In some embodiments, a motor controller is disposed within the housing. In some embodiments, a network input/output device is configured to communicate with a computer device over a communications network. In some embodiments, the actuator is controlled remotely by one or more commands received from the computer device.

In some embodiments, the actuator is a linear actuator configured to move the actuator arm toward or away from the housing.

In some embodiments, the device includes a camera in communication with the computer device over the communications network to provide video to the computer device.

In some embodiments, the actuator arm is configured to have a linear travel distance of less than 5 mm. In some embodiments, the actuator arm is configured to have a linear travel distance of less than 3 mm.

In some embodiments, the housing includes a plurality of mounting apertures around a periphery of the housing, the plurality of mounting apertures configured to secure the device to a rack including a plurality of electronic devices.

In some embodiments, the device includes an input/output device configured to be connected to a computer device.

In some embodiments, the input/output device is configured to receive power for the device.

In some embodiments, a system includes a computer device. In some embodiments, the system includes a remote controller. In some embodiments, the remote controller includes a housing; and an actuator disposed within the housing. In some embodiments, the actuator includes an actuator arm extending from the housing. In some embodiments, a motor controller is disposed within the housing. In some embodiments, a network input/output device configured to communicate with the computer device over a communications network. In some embodiments, the actuator is controlled remotely by one or more commands received from the computer device.

In some embodiments, the actuator is a linear actuator configured to move the actuator arm toward or away from the housing.

In some embodiments, the system includes a camera in communication with the computer device over the communications network to provide video to the computer device.

In some embodiments, the actuator arm is configured to have a linear travel distance of less than 5 mm. In some embodiments, the actuator arm is configured to have a linear travel distance of less than 3 mm.

In some embodiments, the housing includes a plurality of mounting apertures around a periphery of the housing, the plurality of mounting apertures configured to secure the remote controller to a rack including a plurality of electronic devices.

In some embodiments, the remote controller includes an input/output device configured to be connected to a computer device.

In some embodiments, the input/output device is configured to receive power for the remote controller.

In some embodiments, a system includes a computer device. In some embodiments, the system includes a remote controller. In some embodiments, the remote controller includes a housing; and an actuator disposed within the housing. In some embodiments, the actuator includes an actuator arm extending from the housing. In some embodiments, the actuator arm is configured to depress a control button on an electronic device when in an extended state. In some embodiments, the actuator arm is configured to release the control button on the electronic device when in a retracted state. In some embodiments, a motor controller is disposed within the housing. In some embodiments, a network input/output device configured to communicate with the computer device over a communications network. In some embodiments, a camera is in communication with the computer device over the communications network to provide video to the computer device for controlling the actuator arm. In some embodiments, the actuator is controlled remotely by one or more commands received from the computer device.

In some embodiments, in response to the actuator arm depressing the control button, the electronic device is configured to be in a broadcast mode.

In some embodiments, the actuator is a linear actuator having a linear travel distance of less than 5 mm. In some embodiments, the actuator is a linear actuator having a linear travel distance of less than 3 mm.

BRIEF DESCRIPTION OF THE DRAWINGS

References are made to the accompanying drawings that form a part of this disclosure and illustrate embodiments in which the systems and methods described in this Specification can be practiced.

Like reference numbers represent the same or similar parts throughout.

DETAILED DESCRIPTION

Figure 1:
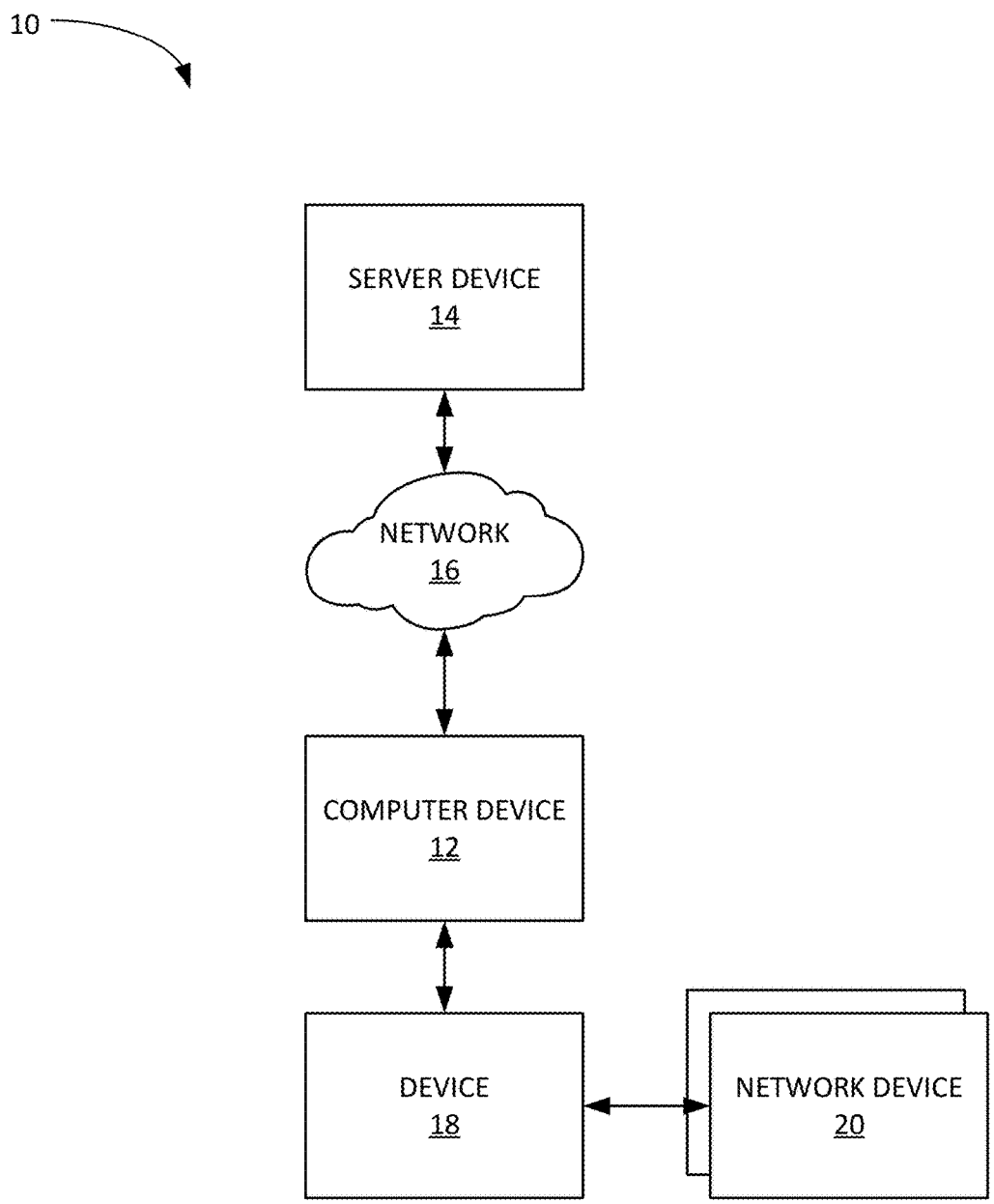
FIG. 1 shows a system for erasing data from network devices, according to some embodiments.

FIG. 1 shows a system 10 for erasing data from network devices, according to some embodiments. The system 10 can be used for the operations described in accordance with the methods described herein for erasing data from a network device.

The system 10 can include a computer device 12 in communication with a server device 14 through a network 16. The system 10 can also include a device 18 for connecting a network device 20 for erasure.

The computer device 12 can include an application that permits a user to connect the network device 20, reset the network device 20 to its factory settings, and erase user-addressable storage locations of the network device 20. Erasing these locations can, for example, remove any configuration settings that a prior user had saved on the network device 20. The resetting and erasing can be performed, for example, on a network device 20 that has been received for refurbishing or the like. The computer device 12 includes a display for showing progress and reporting statuses of the resetting and erasing. Example GUIs are shown and described in additional detail below. The computer device 12 may include a portion of the resetting and erasing functionality, while another portion may require interaction with the server device 14. This can, for example, prevent hijacking of the process at the computer device 12 or other unauthorized resetting and erasing of the network device 20.

The server device 14 can include an application that permits the user to reset and erase the network device 20. In some embodiments, the application on the server device 14 can receive one or more details of device information from the computer device 12 and be configured to provide one or more configuration files to the computer device 12 in return. Collectively, the computer device 12 and the server device 14 can reset and erase the network device 20.

The network 16 may be referred to as the communications network 16. Examples of the network 16 include, but are not limited to, a local area network (LAN), a wide area network (WAN), the Internet, or the like. The computer device 12 can transmit data via the network 16 through a wireless connection using Wi-Fi, Bluetooth, or other similar wireless communication protocols. The computer device 12 can transmit data via the network 16 through a cellular, 3G, 4G, 5G, or other wireless protocol.

In some embodiments, the device 18 is configured to be capable of connecting a plurality of network devices. In some embodiments, the device 18 can be configured to be capable of connecting up to 20 network devices concurrently. In some embodiments, the device 18 can be configured to enable connection of more than 20 network devices. In some embodiments, the device 18 can be configured to enable connection of less than 20 network devices. Additional details about the device 18 are shown and described in accordance with FIG. 3 below.

Figure 2:
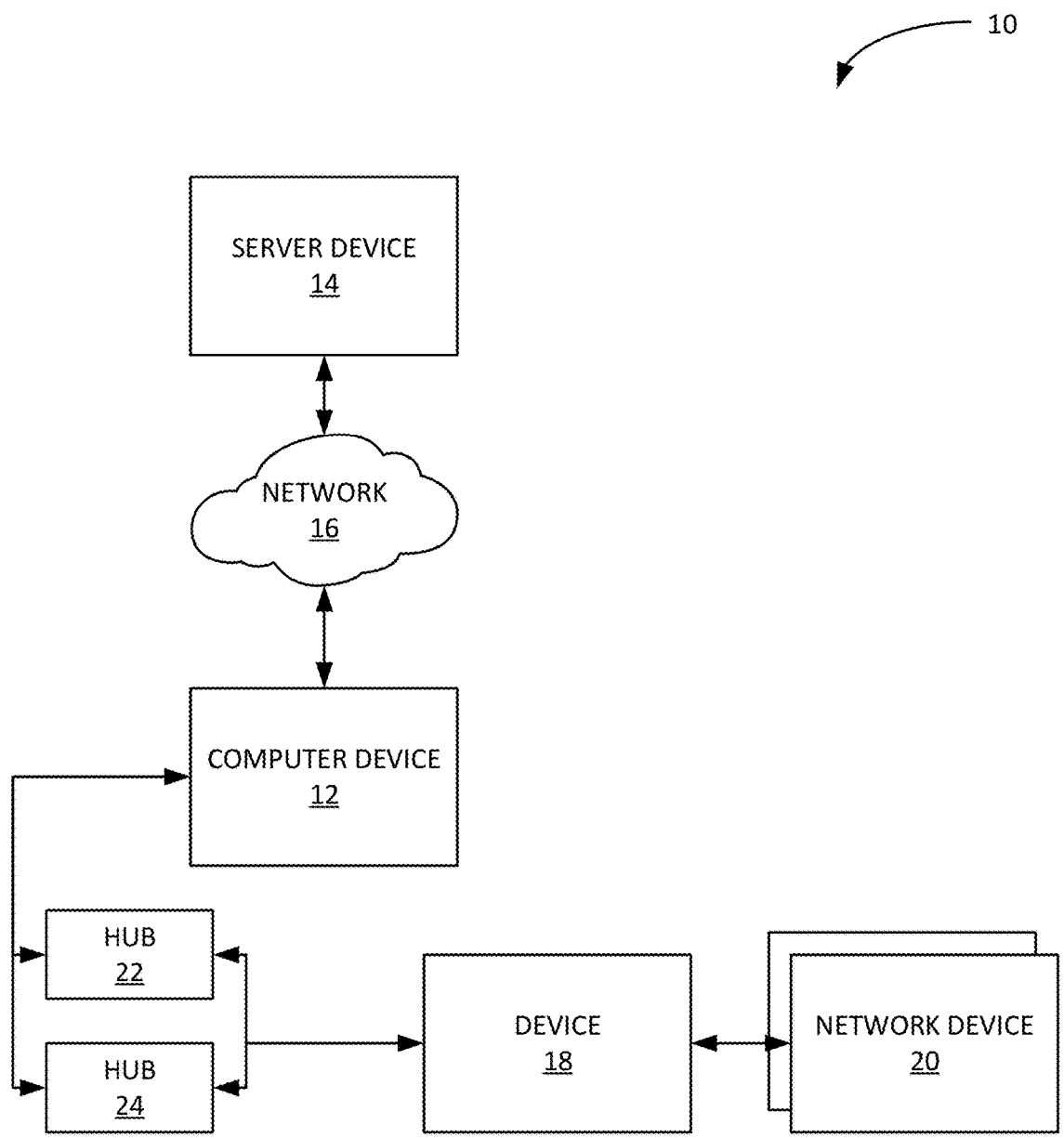
FIG. 2 shows a system for erasing data from network devices, according to some embodiments.

FIG. 2 shows the system 10 of FIG. 1 for erasing data from network devices, according to some embodiments. For simplicity of this Specification, aspects FIG. 2 that have already been described relative to FIG. 1 are not described in additional detail.

As illustrated, the system 10 includes a first hub 22 and a second hub 24.

The first hub 22 is communicatively coupled to the computer device 12. The first hub 22 can be a USB hub configured to provide a plurality of USB connections. In some embodiments, the size of the USB hub can be selected to match a number of ports on the device 18.

The second hub 24 is communicatively coupled to the computer device 12. The second hub can be a switch configured to provide a plurality of ethernet ports. In some embodiments, the size of the switch can be selected to match a number of ports on the device 18.

Figure 3:
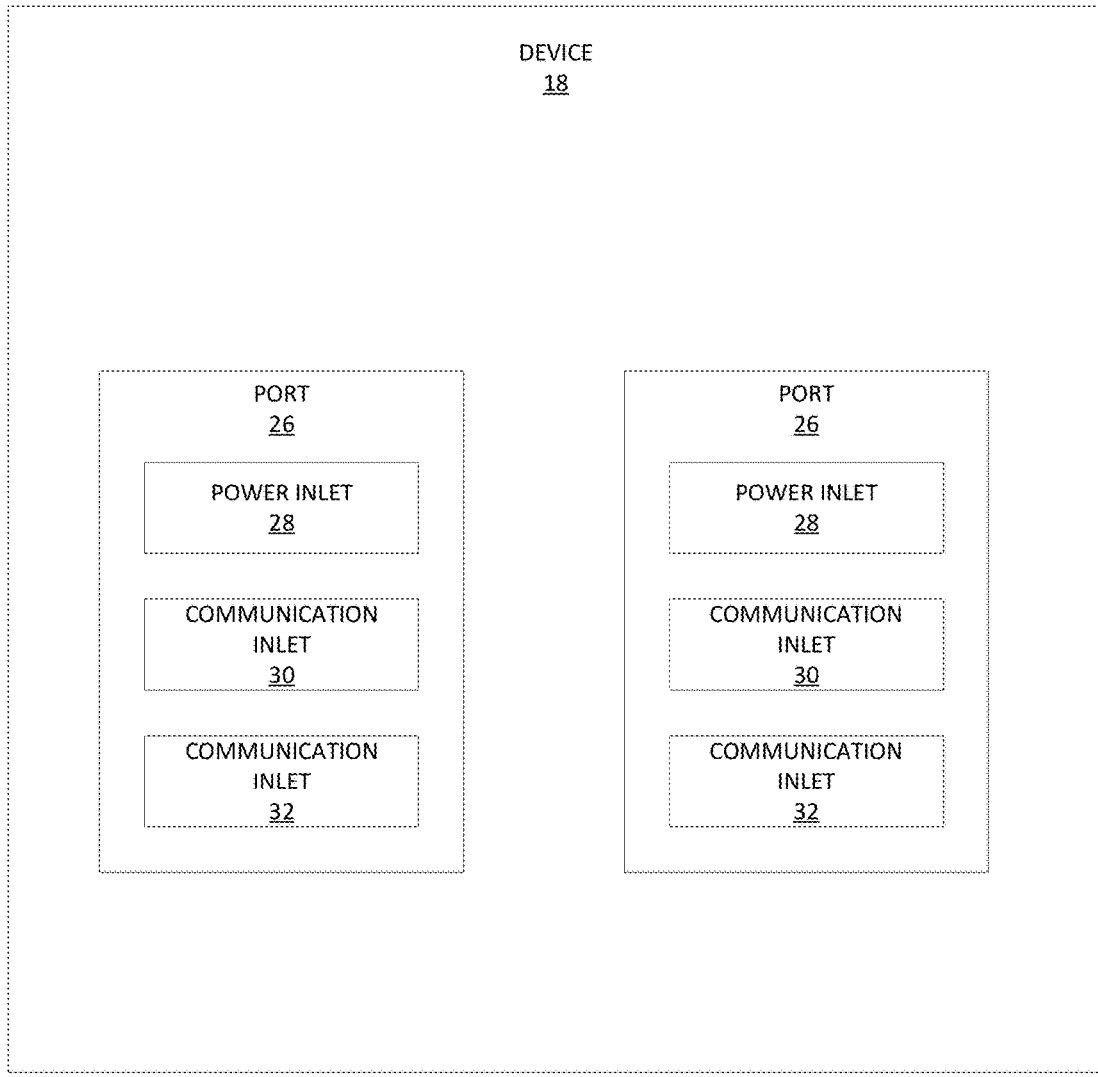
FIG. 3 shows an example device for connecting a plurality of network devices to the system of FIG. 1 or 2, according to some embodiments.

FIG. 3 shows the device 18 for connecting a plurality of network devices to the system 10 of FIG. 1 or 2, according to some embodiments.

The device 18 includes a plurality of ports 26. The number of the ports 26 can be selected to determine a number of network devices (e.g., network device 20 of FIGS. 1-2) that can be connected to the computer device 12 (FIGS. 1-2) concurrently.

Each port 26 includes a power inlet 28, a communication inlet 30, and a communication inlet 32. In some embodiments, the power inlet 28 is configured to receive a power line from a network device. In some embodiments, the communication inlet 30 is configured to enable the network device to communicate with the computer device 12. In some embodiments, the communication inlet 30 can be a universal serial bus (USB) port. In some embodiments, the communication inlet 32 can be an ethernet port configured to receive an ethernet connection from the network device.

Figure 4:
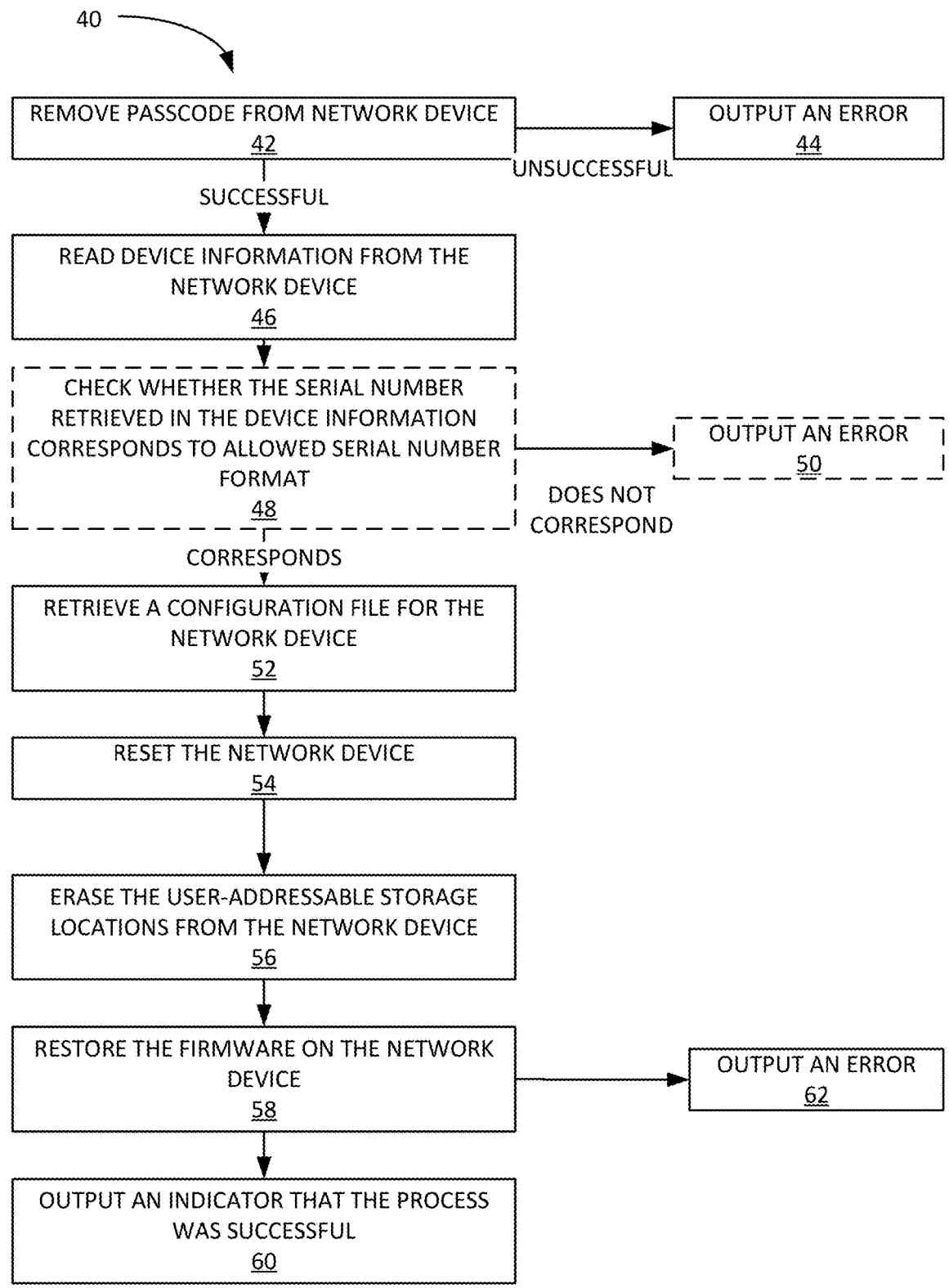
FIG. 4 shows a flowchart of a method for erasing a network device, according to some embodiments.

FIG. 4 shows a flowchart of a method 40 for erasing a network device (e.g., the network device 20 of FIG. 1), according to some embodiments.

At block 42, the computer device 12 removes a passcode from the network device 20. In some embodiments, if the computer device 12 is unable to remove the passcode, the method 40 includes outputting an error at block 44. In some embodiments, the error can be output and displayed on a user interface of the computer device 12.

If the passcode was successfully removed at block 42, the method 40 includes reading device information from the network device 20 at block 46. The device information can include, for example, a model number, a serial number, a MAC address, any combination thereof, or the like.

Optionally, at block 48, the method 40 can include checking whether the serial number retrieved at block 46 corresponds to a format of allowed serial numbers. For example, a range of serial numbers may be indicative of a particular manufacturer or particular device type of the network device 20. The computer device 12 can verify whether the serial number as read corresponds to a subset of serial numbers identified as being allowed. If the serial number does not correspond to the allowed serial numbers, the method 40 can include outputting an indication that the network device 20 cannot be erased at block 50.

If block 48 results in the serial number corresponding to the allowed serial numbers, or the optional block 48 is not present, the method includes retrieving a configuration file for the network device 20 from the server device 14 at block 52.

At block 54, the network device 20 is reset using the configuration file.

At block 56, user-addressable storage locations of the network device 20 are erased. In some embodiments, a 3-pass clearing that is compliant with the National Institute of Standards and Technology (NIST) is performed for the erasing at block 56. In some embodiments, a different number of passes may be used.

At block 58 the firmware is restored on the network device 20. At block 60, if the clearing and the restoration of the firmware were successful, the computer device 12 outputs an indicator that the process was successful. In some embodiments, the output being successful can be displayed in a GUI to the user of the computer device 12 so that the network device 20 can be disconnected. At block 62, if the clearing the restoration were unsuccessful, and error message can be output.

Figure 5:
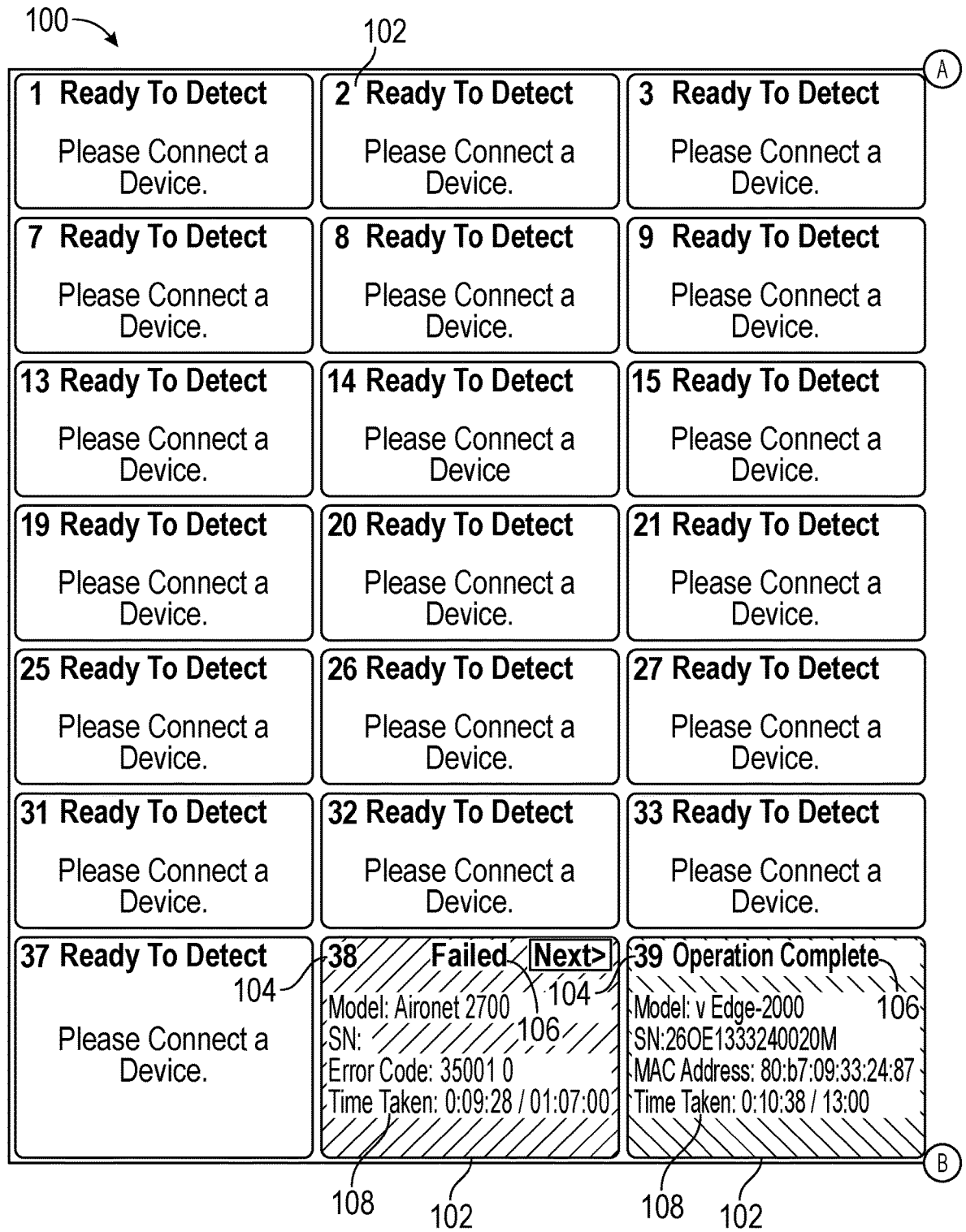
FIG. 5 shows a graphical user interface of the systems of FIG. 1 or 2, according to some embodiments.
Figure 5:
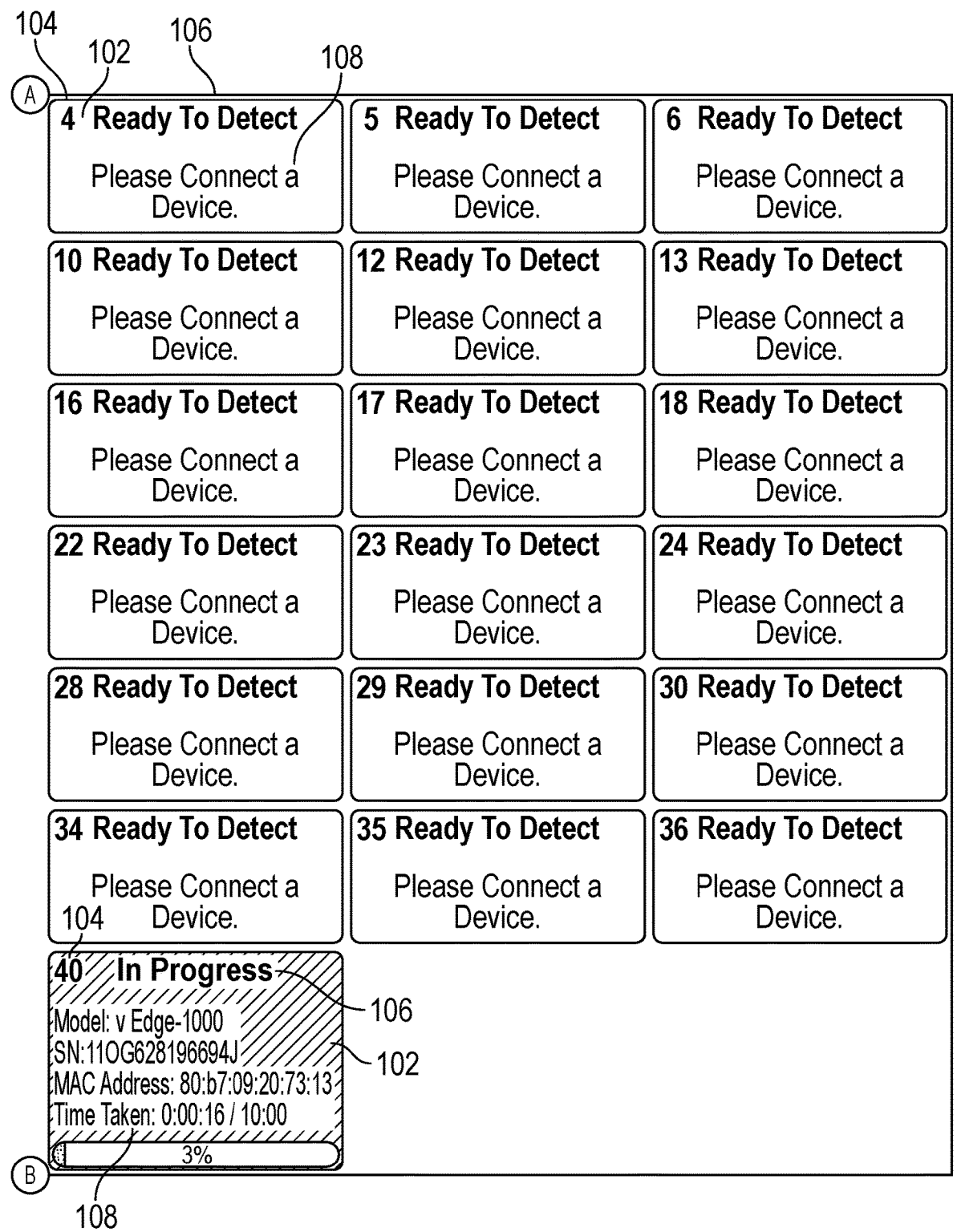

FIG. 5 shows a graphical user interface (GUI) 100 of the system 10 of FIG. 1 or 2, according to some embodiments. The GUI 100 can be representative of a status interface for the system 10 (FIGS. 1-2).

The GUI 100 includes a plurality of indicators 102. The plurality of indicators 102 can be based on a maximum number of network devices that are connectable to the computer device 12 (FIGS. 1-2). In the illustrated embodiment, 40 indicators 102 are shown. It is to be appreciated that the number can vary according to the principles described herein. Each indicator 102 includes a device label 104, a status indicator 106, and a status summary 108.

In the illustrated embodiment, the device label 104 for each of the indicators 102 corresponds to a number of the port on the corresponding device for connecting the network devices. For example, in the illustrated embodiment, the device labels 104 range from 1 to 40.

In the illustrated embodiment, the status indicator 106 can include "Ready to Detect," "Failed," "Operation Complete," or "In Progress." It is to be appreciated that these are examples and that the exact text can vary to be representative of statuses including open ports (e.g., ready for a network device to be connected), unsuccessful attempts, completed attempts, or attempts still in progress.

In the illustrated embodiment, the status summary 108 can vary depending on, for example, a current status. For example, in the indicators 102 in which the status indicator 106 is "Ready to Detect," the status summary 108 includes a message indicating that the user can connect a device. In the indicator 102 in which the status indicator 106 is "Failed," the status summary 108 can include information about the device, an error code, any combination thereof, or the like. In the indicator 102 in which the status indicator 106 is "Operation Complete," the status summary 108 can include a model number, serial number, MAC address, duration to complete, any combination thereof, or the like. In the indicator 102 in which the status indicator 106 is "In Progress," the status summary 108 can include a model number, a serial number, a MAC address, a time taken, a status bar indicating a percentage complete, any combination thereof, or the like.

In some embodiments, the indicators 102 can be color coded or the like so that the user can easily differentiate between statuses of the various network devices or open ports.

Figure 6:
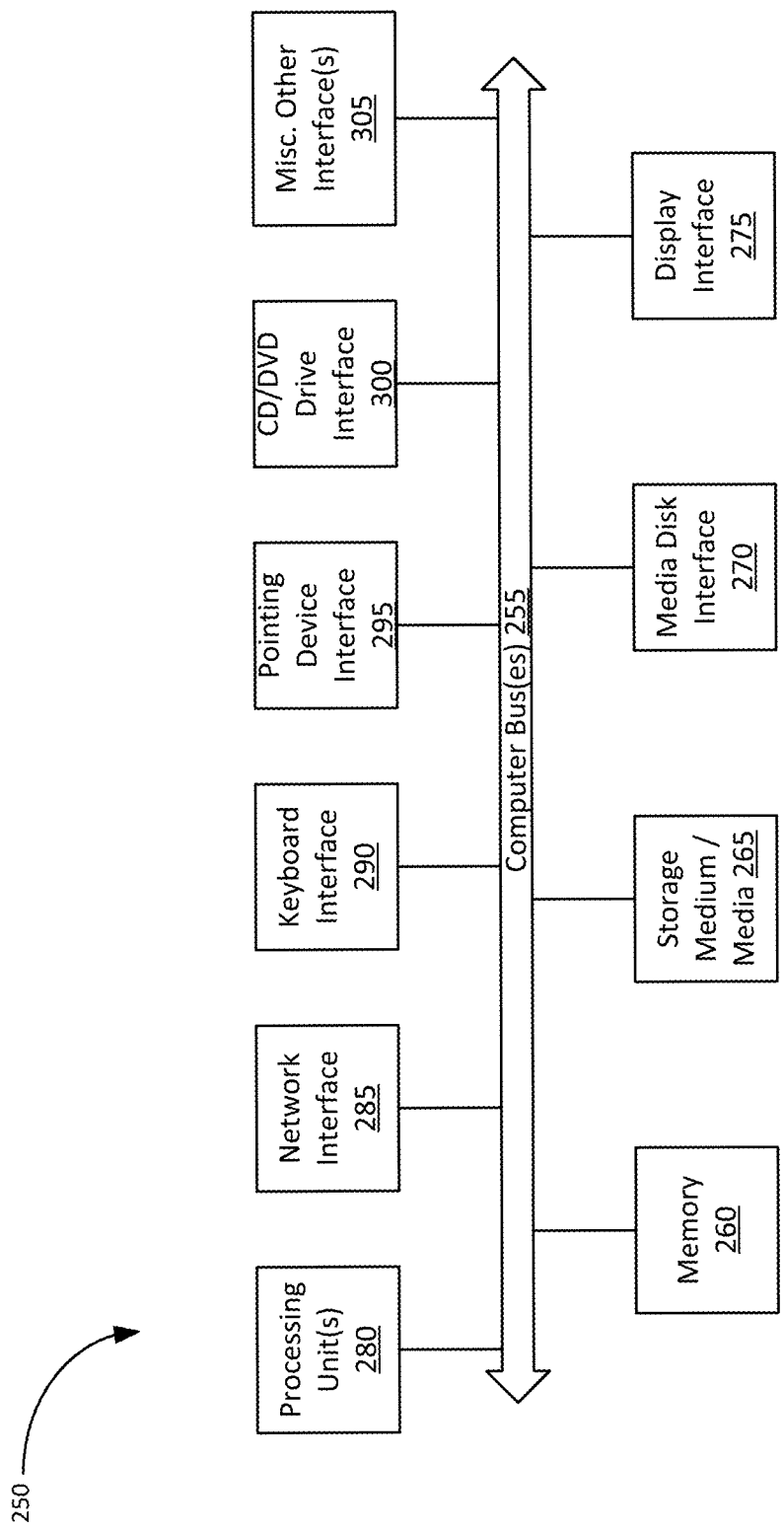
FIG. 6 shows a block diagram illustrating an internal architecture of an example of a computer, according to some embodiments.

FIG. 6 shows a block diagram illustrating an internal architecture of an example of a computer, according to some embodiments. In some embodiments, the computer can be, for example, the computer device 12 and/or server device 14 in accordance with some embodiments. A computer as referred to herein refers to any device with a processor capable of executing logic or coded instructions, and could be a server, personal computer, set top box, smart phone, pad computer or media device, to name a few such devices. As shown in the example of FIG. 6, internal architecture 250 includes one or more processing units (also referred to herein as CPUs) 280, which interface with at least one computer bus 255. Also interfacing with computer bus 255 are persistent storage medium/media 265, network interface 285, memory 260, e.g., random access memory (RAM), run-time transient memory, read only memory (ROM), etc., media disk drive interface 270 as an interface for a drive that can read and/or write to media including removable media such as floppy, CD ROM, DVD, etc. media, display interface 275 as interface for a monitor or other display device, keyboard interface 290 as interface for a keyboard, pointing device interface 295 as an interface for a mouse or other pointing device, and miscellaneous other interfaces not shown individually, such as parallel and serial port interfaces, a universal serial bus (USB) interface, and the like.

Memory 260 interfaces with computer bus 255 so as to provide information stored in memory 260 to CPU 280 during execution of software programs such as an operating system, application programs, device drivers, and software modules that comprise program code, and/or computer executable process operations, incorporating functionality described herein, e.g., one or more of process flows described herein. CPU 280 first loads computer executable process operations from storage, e.g., memory 260, storage medium/media 265, removable media drive, and/or other storage device. CPU 280 can then execute the stored process operations in order to execute the loaded computer-executable process operations. Stored data, e.g., data stored by a storage device, can be accessed by CPU 280 during the execution of computer-executable process operations.

Persistent storage medium/media 265 is a computer readable storage medium(s) that can be used to store software and data, e.g., an operating system and one or more application programs. Persistent storage medium/media 265 can also be used to store device drivers, such as one or more of a digital camera driver, monitor driver, printer driver, scanner driver, or other device drivers, web pages, content files, playlists, and other files. Persistent storage medium/media 265 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

Figure 7:
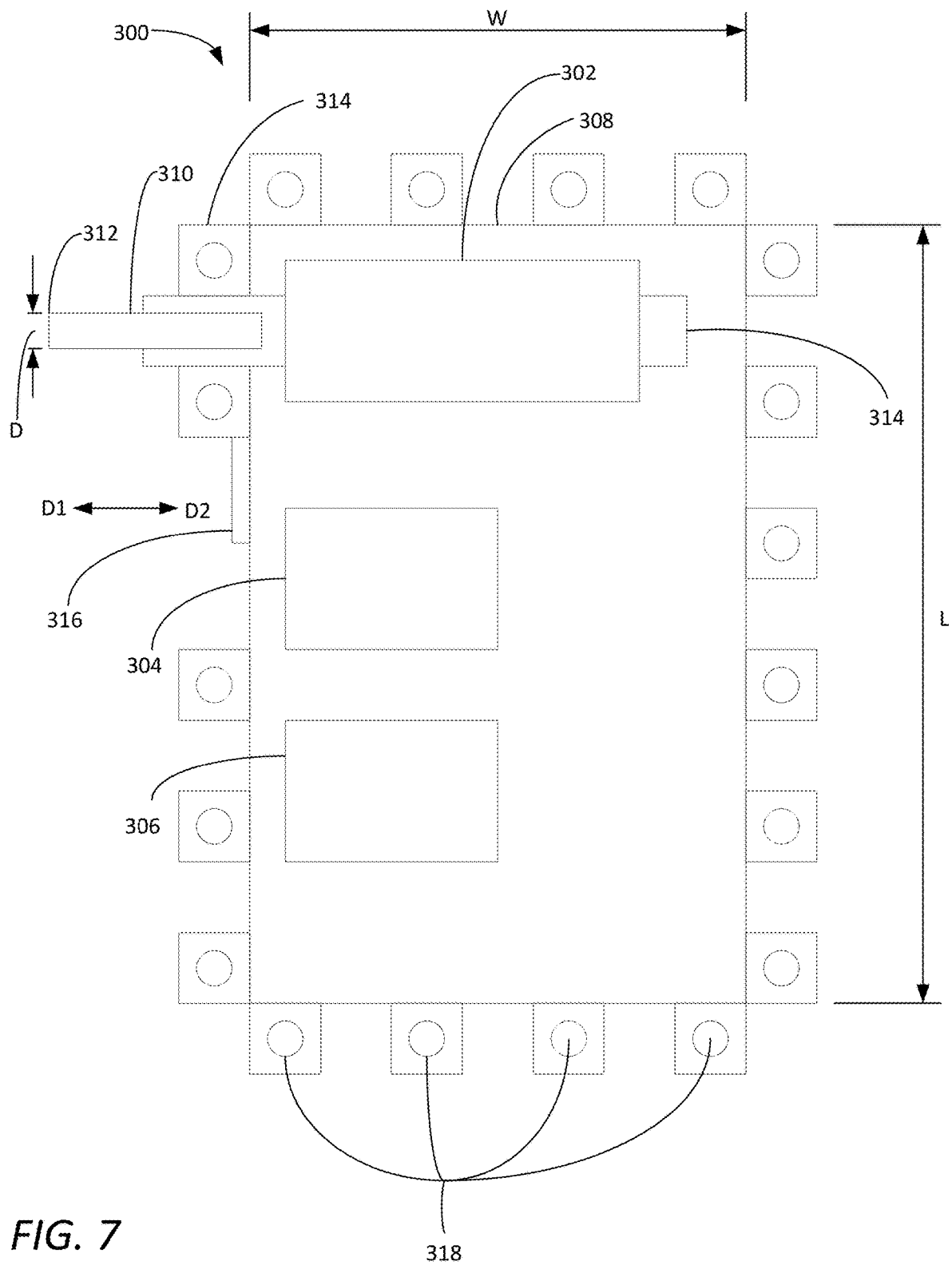
FIG. 7 shows a schematic diagram of a remote controller for an electronic device, according to some embodiments.
Figure 8:
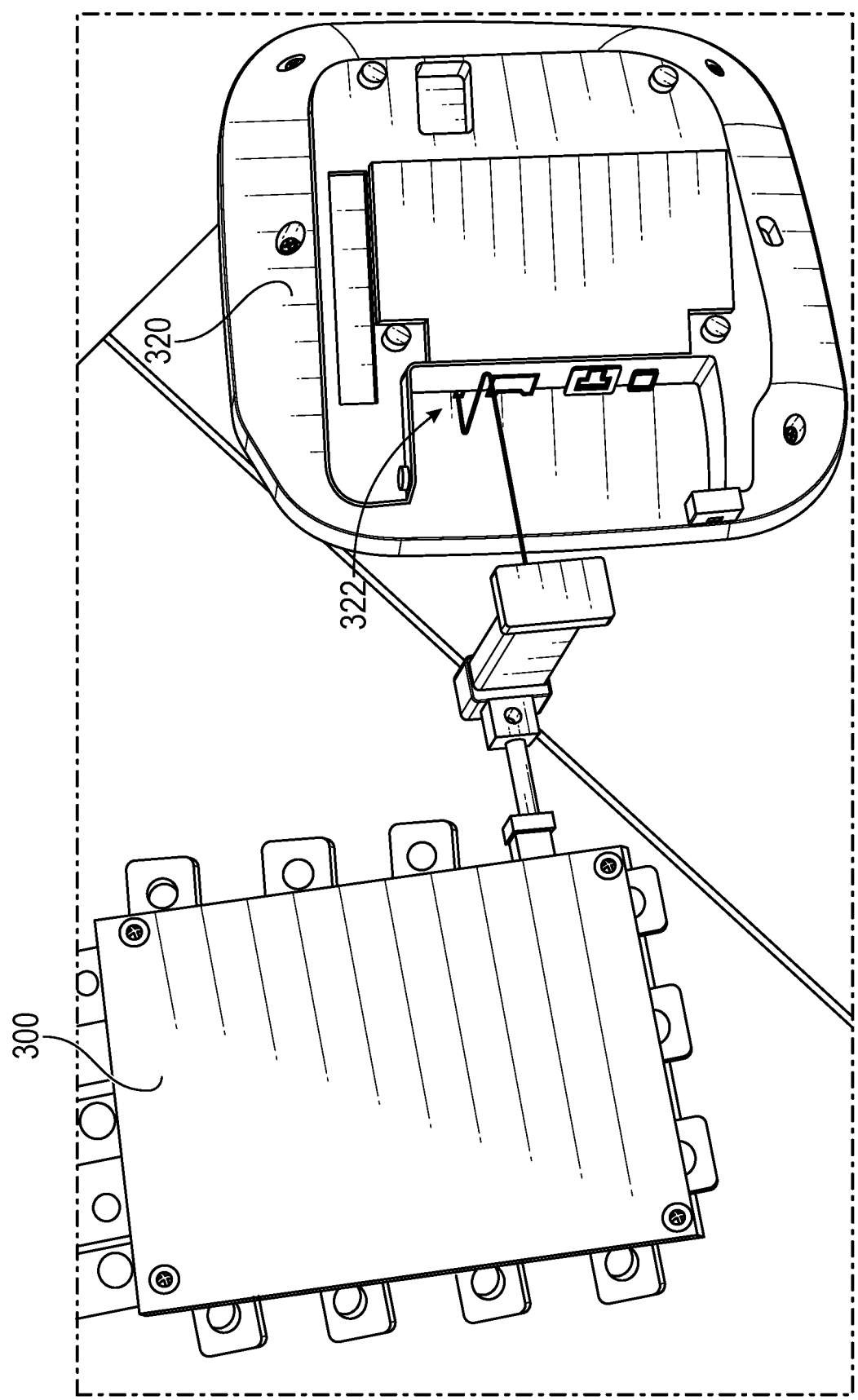
FIG. 8 shows a schematic diagram for a system including the remote controller for an electronic device of FIG. 7, according to some embodiments.

FIG. 7 shows a schematic diagram of a remote controller 300 for an electronic device, according to some embodiments. FIG. 8 shows a schematic diagram of the remote controller 300 of FIG. 7 with an electronic device 320, according to some embodiments. FIGS. 7-8 will be referenced collectively unless specific reference is made otherwise.

The remote controller 300 includes an actuator 302, a motor controller 304, and a network input/output device 306 installed within a housing 308. It is to be appreciated that there can be other components such as, but not limited to, a power supply, a power converter, or the like. In some embodiments, the power supply can be within the housing 308, while in some embodiments, the power supply can be external from the housing and connected via, for example, a wired connection.

In some embodiments, the actuator 302 is a linear actuator. In such embodiments, the actuator 302 can be controlled by the motor controller 304 to move an actuator arm 310 in a direction D1 away from the housing (e.g., to an extended state) or a direction D2 toward the housing (e.g., a retracted state).

In some embodiments, the actuator arm 310 can have an end 312. The end 312 can be sized such that the end 312 is capable of depressing a button 322 on the electronic device 320. In some embodiments, the actuator arm 310 can be a wire or cylindrical member and can have a diameter D that is smaller than an opening for the button 322 on the electronic device 320. In some embodiments, the diameter D can be, for example, less than 5 mm. The electronic device 320 can be placed so that the actuator arm 310, when in the extended state, depresses the button 322 on the electronic device 320 and, when in the retracted state, the actuator arm 310 releases the button 322 on the electronic device 320.

The actuator arm 310 can be attached to a movable member 314 of the actuator 302 at a location that is within the housing 308 or at a location that is outside the housing 308. In some embodiments, it may be simpler to have the connection outside the housing 308 to enable changing or replacement of the actuator arm 310 without opening the housing 308.

In some embodiments, the actuator arm 310 can have a linear travel distance of less than 10 mm. In some embodiments, the linear travel distance is a distance between the extended state and the retracted state. That is, when moving from the retracted state to the extended state, or from the extended state to the retracted state, the actuator arm 310 can move the linear travel distance. In some embodiments, the linear travel distance can be less than 9 mm. In some embodiments, the linear travel distance can be less than 8 mm. In some embodiments, the linear travel distance can be less than 7 mm. In some embodiments, the linear travel distance can be less than 6 mm. In some embodiments, the linear travel distance can be less than 5 mm. In some embodiments, the linear travel distance can be less than 4 mm. In some embodiments, the linear travel distance can be less than 3 mm. In some embodiments, the linear travel distance can be less than 2 mm. In some embodiments, the linear travel distance can be increased to be greater than 10 mm. However, the placement of the electronic device 320 would be farther from the remote controller 300 when in use.

In some embodiments, the remote controller 300 can include a camera 316. The camera 316 is capable of capturing a video stream. The video stream can be monitored remotely so that an operator can control the remote controller 300 to interact with the electronic device 320 even when the operator is in a different location. The operator can communicate with the remote controller 300 via the network input/output device 306 to control the motor controller 304 and thereby cause the actuator 302 to be moved between the extended and retracted states.

In some embodiments, the housing 308 can be rectangular in geometry. In some embodiments, the housing 308 can have a compact form factor. For example, in some embodiments, the housing 308 can have a length L that is less than 18 cm, a width W that is less than 14 cm, and a height (depth into the page in the illustrations) that is less than 4 cm.

In some embodiments, the housing 308 can include a plurality of apertures 318 around a perimeter of the housing 308. It is to be appreciated that the number and shape of the apertures 318 is an example and can vary beyond what is shown. In some embodiments, the apertures 318 can be used to secure the remote controller 300 to, for example, a rack including electronic devices. In some embodiments, the remote controller 300 can be secured so that the remote controller 300 is able to depress the button 322 on the electronic device 320 instead of being forced away from the electronic device in response to the actuation of the actuator 302.

In FIG. 8, the actuator arm 310 is shown in the extended state so that a button 322 of the electronic device 320 is depressed. The remote controller 300 can be controlled by an operator to selectively depress the button 322 of the electronic device 320 to, for example, place the electronic device 320 in a particular mode, such as, but not limited to, a broadcast mode. As a result, the remote controller 300 can be used and controlled by an operator remote from the location of the electronic device 320 to learn configuration settings of the electronic device 320, allowing the operator to update the system 10 (FIG. 1).

In some embodiments, the remote controller 300 can be used to perform a particular button pressing sequence specific to the electronic device 320. In some embodiments, the button 322 can be depressed to, for example, control an operating mode of the electronic device 320. The electronic device 320 can be a variety of electronic devices including a button such as the button 322. In some embodiments, the electronic device 320 can be a network device. In some embodiments, the electronic device 320 can be a device other than a network device. In some embodiments, the remote controller 300 can be used to depress a control button for a network device to place the network device in a broadcast mode or the like so that one or more device settings can be learned from the network device. In some embodiments, the remote controller 300 can be used, for example, to train the system 10 (FIG. 1) to communicate with new devices which have not been previously configured for the system 10 (FIG. 1). In some embodiments, the remote controller 300 can be controlled remotely (e.g., from a different location) to enable remote configuration of the system 10 (FIG. 1). In some embodiments, the remote controller 300 can be installed in a factory or other location in which electronic devices are being refurbished without requiring technical expertise to configure the system 10 (FIG. 1). Thus the remote controller 300 can be controlled from a remote location via, for example, a computer device and a communications network, as discussed in additional detail in accordance with FIGS. 9-10 below.

Figure 9:
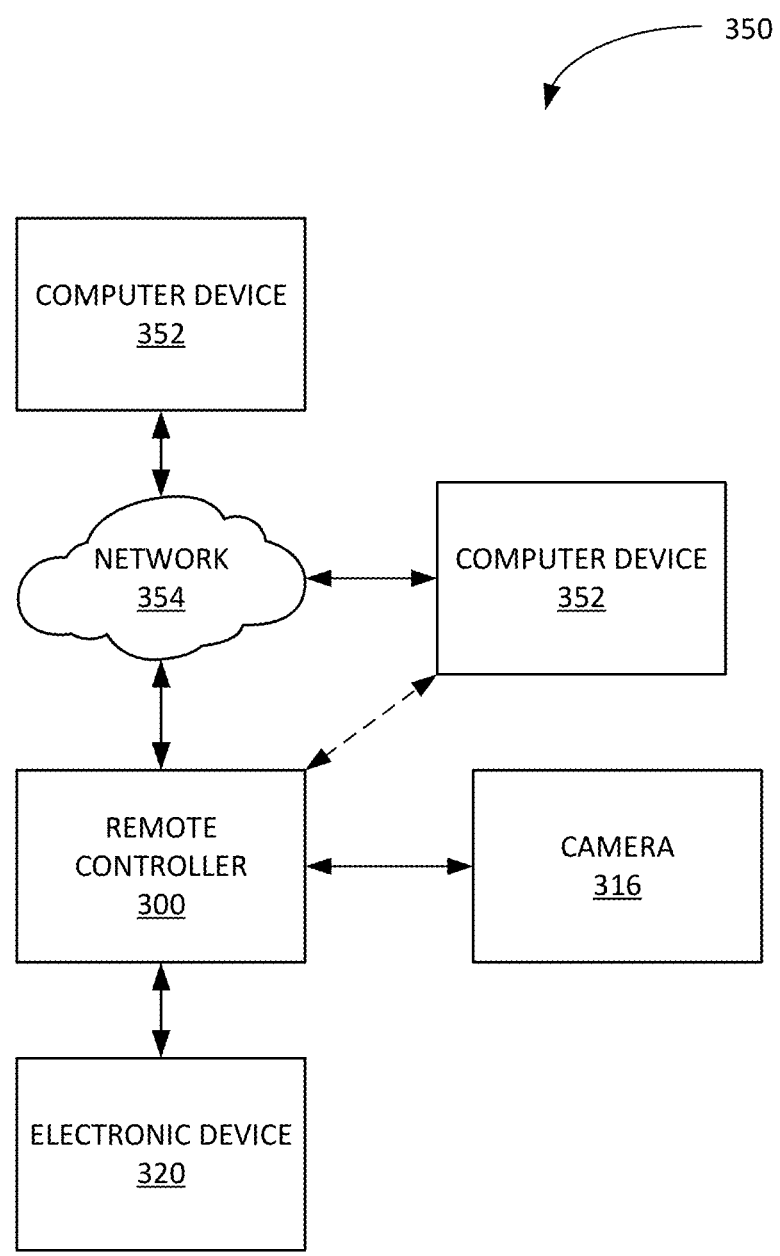
FIG. 9 shows a schematic diagram of the remote controller of FIG. 7 with an electronic device, according to some embodiments.

FIG. 9 shows a schematic diagram for a system 350 including the remote controller 300 for an electronic device of FIG. 7, according to some embodiments.

The system 350 includes a computer device 352 in communication with the remote controller 300 via a communications network 354. In some embodiments, the computer device 352 can be used to control the remote controller 300.

The computer device 352 can receive a video stream including video captured by camera 316. The camera 316 can be included as part of the remote controller 300 (e.g., as in FIG. 7) or can be separate from the remote controller 300 as shown in FIG. 9, according to some embodiments.

The operator of the computer device 352 can control an actuation state of the remote controller 300 to provide an appropriate button pressing sequence to operate on the electronic device 320. For example, in some embodiments, the electronic device 320 may be placed into a broadcast mode when the button 322 is depressed for a particular period of time. This can enable the operator to determine one or more configuration settings of the electronic device 320. Thus, the operator can update the system 10 (FIG. 1) to include additional electronic devices and the system 10 (FIG. 1) can be updated over time to capture newly manufactured electronic devices.

The communications network 354 may be referred to as the network 354. Examples of the network 354 include, but are not limited to, a local area network (LAN), a wide area network (WAN), the Internet, or the like. The computer device 352 can transmit data via the network 354 through a wireless connection using Wi-Fi, Bluetooth, or other similar wireless communication protocols. The computer device 352 can transmit data via the network 354 through a cellular, 3G, 4G, 5G, or other wireless protocol.

The remote controller 300 can transmit data via the network 354 through a wireless connection using Wi-Fi, Bluetooth, or other similar wireless communication protocols. The remote controller 300 can transmit data via the network 354 through a cellular, 3G, 4G, 5G, or other wireless protocol.

In some embodiments, the remote controller 300 can be connected in communication with a second computer device 358. The second computer device 358 may be onsite at the location of the remote controller 300. In some embodiments, the remote controller 300 can communicate with the second computer device 358 via a wired connection or through a wireless connection. In some embodiments, the computer device 352 can be in communication with the second computer device 358 via the network 354 to control the remote controller 300.

Figure 10:
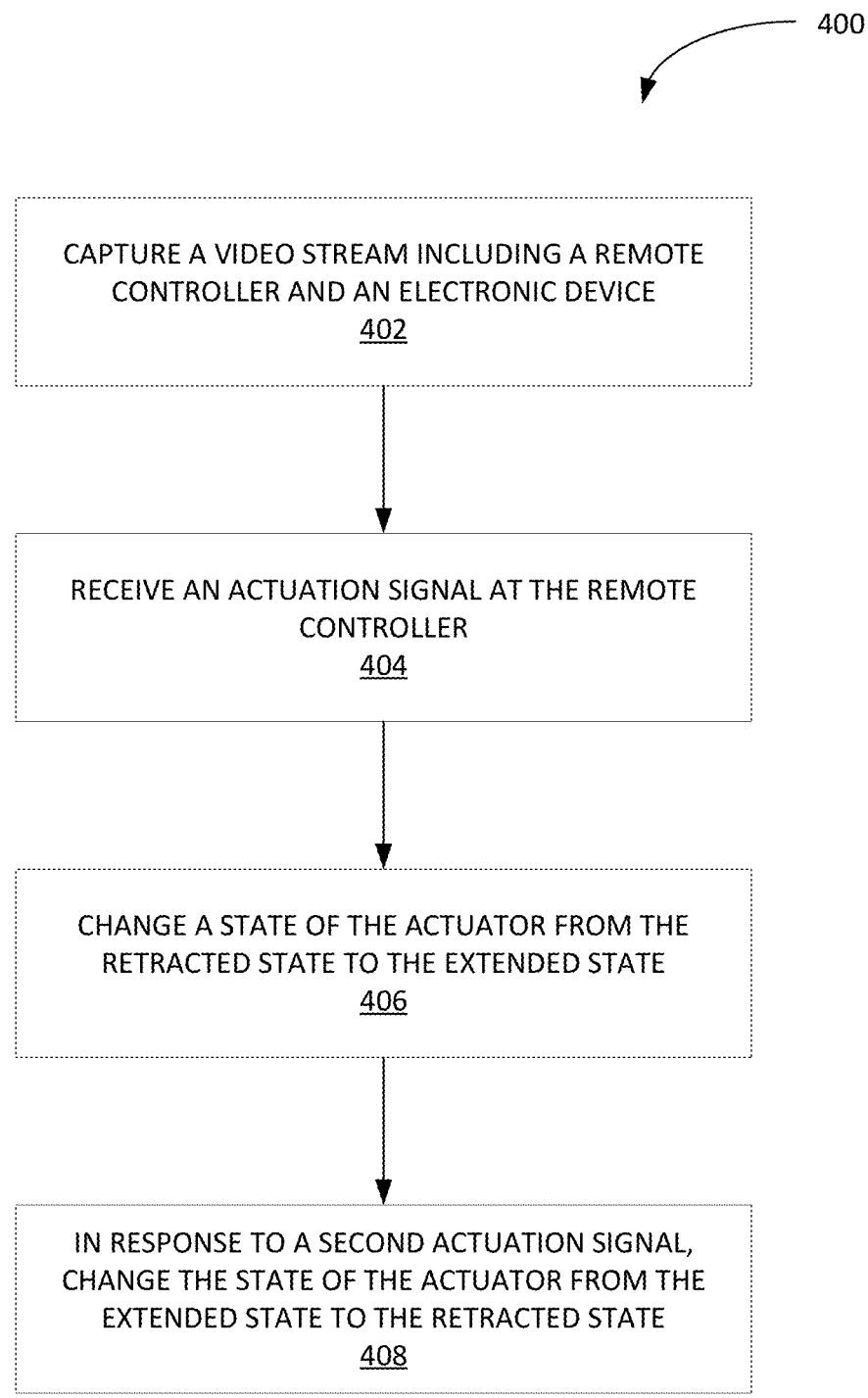
FIG. 10 shows a method of controlling an electronic device using the remote controller of FIG. 7, according to some embodiments.

FIG. 10 shows a method 400 of controlling an electronic device using the remote controller of FIG. 7, according to some embodiments.

At block 402, the method 400 includes providing a video stream including the remote controller 300 and the electronic device 320. In some embodiments, the video stream may not initially show the electronic device 320.

At block 404, the method 400 includes receiving an actuation signal at the remote controller 300.

At block 406, the method 400 includes, in response to receiving the actuation signal, actuating the actuator 302 to extend the actuator arm 310 to the extended state, thereby depressing a button of the electronic device 320.

At block 408, the method 400 includes, in response to receiving a second actuation signal, actuating the actuator 302 to retract the actuator arm 310 to the retracted state, thereby releasing the button of the electronic device 320.

In some embodiments, a timer can be initiated after block 406. In such embodiments, the block 408 may not be utilized. For example, the motor controller 304 can be configured to actuate the actuator 302 to move to the retracted position after a particular period of time such as, but not limited to, 0.5 seconds, 1 second, 2 seconds, 3 seconds, 4 seconds, 5 seconds, 10 seconds, or the like.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device, comprising:
a housing;
an actuator disposed within the housing,
wherein the actuator comprises an actuator arm extending from the housing and configured to depress a button on an electronic device or release the button on the electronic device;
a motor controller disposed within the housing to control the actuator; and
a network input/output device configured to communicate with a computer device over a communications network to receive actuation signals to change a state of the actuator arm from an extended state to a retracted state or the retracted state to the extended state;
wherein the actuation signals are based on one or more commands received from the computer device.

2. The device of claim 1, wherein the actuator is a linear actuator configured to move the actuator arm toward or away from the housing.

3. The device of claim 1, further comprising a camera in communication with the computer device over the communications network to provide video to the computer device.

4. The device of claim 1, wherein the actuator arm is configured to have a linear travel distance of less than 5 mm.

5. The device of claim 1, wherein the actuator arm is configured to have a linear travel distance of less than 3 mm.

6. The device of claim 1, wherein the housing comprises a plurality of mounting apertures around a periphery of the housing, the plurality of mounting apertures configured to secure the device to a rack including a plurality of electronic devices.

7. The device of claim 1, wherein the device comprises an input/output device configured to be connected to a second computer device.

8. The device of claim 7, wherein the input/output device is configured to receive power for the device.

9. A system, comprising:
a computer device;
a remote controller, comprising:
 a housing; and
 an actuator disposed within the housing,
  wherein the actuator comprises an actuator arm extending from the housing and configured to depress a button on an electronic device or release the button on the electronic device;
 a motor controller disposed within the housing to control the actuator; and
 a network input/output device configured to communicate with a computer device over a communications network to receive actuation signals to change a state of the actuator arm from an extended state to a retracted state or the retracted state to the extended state;
 wherein the actuation signals are based on one or more commands received from the computer device.

10. The system of claim 9, wherein the actuator is a linear actuator configured to move the actuator arm toward or away from the housing.

11. The system of claim 9, further comprising a camera in communication with the computer device over the communications network to provide video to the computer device.

12. The system of claim 9, wherein the actuator arm is configured to have a linear travel distance of less than 5 mm.

13. The system of claim 9, wherein the actuator arm is configured to have a linear travel distance of less than 3 mm.

14. The system of claim 9, wherein the housing comprises a plurality of mounting apertures around a periphery of the housing, the plurality of mounting apertures configured to secure the remote controller to a rack including a plurality of electronic devices.

15. The system of claim 9, wherein the remote controller comprises an input/output device configured to be connected to a second computer device.

16. The system of claim 15, wherein the input/output device is configured to receive power for the remote controller.

17. A system, comprising:
a computer device;
a remote controller, comprising:
 a housing; and
 an actuator disposed within the housing,
  wherein the actuator comprises an actuator arm extending from the housing;
  wherein the actuator arm is configured to depress a control button on an electronic device when in an extended state,
  wherein the actuator arm is configured to release the control button on the electronic device when in a retracted state;
 a motor controller disposed within the housing to control the actuator;
 a network input/output device configured to communicate with the computer device over a communications network; and
 a camera in communication with the computer device over the communications network to provide video to the computer device for controlling the actuator arm;
 wherein the actuator is controlled remotely by one or more commands received from the computer device.

18. The system of claim 17, wherein in response to the actuator arm depressing the control button, the electronic device is configured to be in a broadcast mode.

19. The system of claim 17, wherein the actuator is a linear actuator having a linear travel distance of less than 5 mm.

20. The system of claim 17, wherein the actuator is a linear actuator having a linear travel distance of less than 3 mm.

* * * * *